(12) United States Patent
Sun

(10) Patent No.: US 8,982,838 B2
(45) Date of Patent: Mar. 17, 2015

(54) METHOD FOR PROCESSING DATA ASSOCIATED WITH HANDOVER IN A WIRELESS NETWORK

(75) Inventor: Li-Hsiang Sun, San Diego, CA (US)

(73) Assignee: LG Electronics Inc., Seoul (KR)

( * ) Notice: Subject to any disclaimer, the term of this patent is extended or adjusted under 35 U.S.C. 154(b) by 458 days.

(21) Appl. No.: 13/369,767

(22) Filed: Feb. 9, 2012

(65) Prior Publication Data

US 2012/0207129 A1    Aug. 16, 2012

Related U.S. Application Data

(60) Provisional application No. 61/442,133, filed on Feb. 11, 2011, provisional application No. 61/479,325, filed on Apr. 26, 2011.

(51) Int. Cl.
*H04W 76/00* (2009.01)
*H04W 36/00* (2009.01)

(52) U.S. Cl.
CPC .............. *H04W 76/00* (2013.01); *H04W 36/00* (2013.01)
USPC ........................................................ 370/331

(58) Field of Classification Search
CPC ................................................. H04W 36/0016
See application file for complete search history.

(56) References Cited

U.S. PATENT DOCUMENTS

| | | | | |
|---|---|---|---|---|
| 8,477,724 | B2 * | 7/2013 | Bakker et al. ................. | 370/331 |
| 2010/0272013 | A1 * | 10/2010 | Horn et al. ..................... | 370/328 |
| 2010/0278108 | A1 * | 11/2010 | Cho et al. ...................... | 370/328 |
| 2010/0284386 | A1 * | 11/2010 | Ulupinar et al. .............. | 370/338 |
| 2010/0329205 | A1 * | 12/2010 | Bi et al. ......................... | 370/331 |
| 2011/0171915 | A1 * | 7/2011 | Gomes et al. ................... | 455/73 |
| 2013/0337812 | A1 * | 12/2013 | Pekonen et al. .............. | 455/436 |

OTHER PUBLICATIONS

"3rd Generation Partnership Project; Technical Specification Group Core Network and Terminals; Non-Access-Stratum (NAS) functions related to Mobile Station (MS) in idle mode (Release 10)", Section 3.1A, 3GPP TS 23.122 V10.2.0 (Dec. 2010).
"3rd Generation Partnership Project; Technical Specification Group Radio Access Network; Evolved Unviversal Terrestrial Radio Access (E-UTRA) and Evolved Universal Terrestrial Radio Access Network (E-UTRAN); Overall description; Stage 2 (Release 9)", Section 19.2.2.5.1, 3GPP TS 36.300 V9.1.0 (Sep. 2009).

(Continued)

*Primary Examiner* — Ricky Ngo
*Assistant Examiner* — Ben H Liu
(74) *Attorney, Agent, or Firm* — Birch, Stewart, Kolasch & Birch, LLP

(57) ABSTRACT

The technical features of this description provides a method and apparatus of processing data associated with handover in a wireless network transmitting a radio signal based on a number of orthogonal frequency division multiplexing (OFDM) symbols or single carrier frequency division multiple access (SC-FDMA) symbols. In an aspect of the features, when MME learns that HeNB is preparing handover of UE, it sends the UE a PDN CONNECTIVITY REJECT with a proper cause, so that LIPA PDN connection cannot be used in the target cell. Accordingly, the LIPA PDN connection is only restricted to a CSG cell. Moreover, the network can explicitly reject the request from the UE, either before or after handover, thereby avoiding the UE's unnecessary retry.

12 Claims, 13 Drawing Sheets

(56) References Cited

OTHER PUBLICATIONS

"3rd Generation Partnership Project; Technical Specification Group Radio Access Network; Evolved Unviversal Terrestrial Radio Access (E-UTRA) and Evolved Universal Terrestrial Radio Access Network (E-UTRAN); Overall description; Stage 2 (Release 9)", Section 19.2.2.5.5, 3GPP TS 36.300 V9.1.0 (Sep. 2009).

"3rd Generation Partnership Project; Technical Specification Group Services and System Aspects; General Packet Radio Service (GPRS) enhancements for Evolved Universal Terrestrial Radio Access Network (E-UTRAN) access (Release 10)", Section 5.10.2, 3GPP TS 23.401 V10.0.0 (Jun. 2010).

"3rd Generation Partnership Project; Technical Specification Group Services and System Aspects; General Packet Radio Service (GPRS) enhancements for Evolved Universal Terrestrial Radio Access Network (E-UTRAN) access (Release 10)", Section 5.10.3, 3GPP TS 23.401 V10.0.0 (Jun. 2010).

"3rd Generation Partnership Project; Technical Specification Group Services and System Aspects; General Packet Radio Service (GPRS) enhancements for Evolved Universal Terrestrial Radio Access Network (E-UTRAN) access (Release 10)", Section 5.4.1, 3GPP TS 23.401 V10.0.0 (Jun. 2010).

"3rd Generation Partnership Project; Technical Specification Group Services and System Aspects; Service requirements for Home NodeBs and Home eNodeBs (Release 10)", Section 5.7.1, 3GPP TS 22.220 V10.0.0 (Sep. 2009).

* cited by examiner

METHOD FOR PROCESSING DATA ASSOCIATED WITH HANDOVER IN A WIRELESS NETWORK

CROSS-REFERENCE TO RELATED APPLICATIONS

The present application for patent claims priority to Provisional Application No. 61/442,133 filed on Feb. 11, 2011, and Provisional Application No. 61/479,325 filed on Apr. 26, 2011, all of which are incorporated by reference in their entirety herein.

BACKGROUND OF THE INVENTION

1. Field of the Invention

The technical features of this document relate to wireless communications, and more particularly, to a method and apparatus for processing data associated with handover in a wireless network.

2. Related Art

The Third Generation Partnership Project (3GPP) Long Term Evolution (LTE) which is a set of enhancements to the Universal Mobile Telecommunications System (UMTS) is introduced as 3GPP Release 8. The 3GPP LTE uses orthogonal frequency division multiple access (OFDMA) for a downlink, and uses single carrier frequency division multiple access (SC-FDMA) for an uplink, and adopts multiple input multiple output (MIMO) with up to four antennas. In recent years, there is an ongoing discussion on 3GPP LTE-Advanced (LTE-A), which is a major enhancement to the 3GPP LTE.

The 3GPP LTE system may provide closed subscriber group (CSG) services, which can be provided only to a certain group of subscribers, to improve quality of service. A base station (BS) capable of providing CSG services can be referred to as a Home eNodeB (HeNB), and a cell serving CSG members can be referred to as a CSG cell.

In a network system which includes the HeNB, a PDN connection based local IP access (LIPA) can be supported. The LIPA enables an IP-capable UE connected via the HeNB to access other IP-capable entities in the same residential/enterprise IP network without a user plane traversing the mobile operator's network except HeNB subsystem.

Under the current 3GPP specification, the LIPA PDN connection is restricted to the CSG cell. Therefore, if the LIPA PDN connection is carried over across cells, it can cause an abnormal situation in the 3GPP system.

SUMMARY OF THE INVENTION

The technical features of this document provide a method for processing data to associated with handover in a wireless network transmitting a radio signal based on a number of orthogonal frequency division multiplexing (OFDM) symbols or single carrier frequency division multiple access (SC-FDMA) symbols. The technical features can be used to improve the performance of the wireless network.

In one aspect, the method comprises transmitting, by a mobility management entity (MME) of the wireless network, a bearer setup request for a packet data network (PDN) connection based on local Internet protocol access (LIPA) to a source base station; receiving, by the MME, a bearer setup response from the source base station, the bearer setup response indicating that the source base station rejects the bearer setup request due to a triggered handover of a user equipment (UE); and transmitting, by the MME, a packet data network (PDN) connection reject message to the UE when the source base station rejects the bearer setup request due to the triggered handover of the UE; and releasing, by a core network (CN) entity, a network resource for the packet data network (PDN) connection based on the local Internet protocol access (LIPA) when the source base station rejects the bearer setup request due to the triggered handover of the UE.

The packet data network (PDN) connection reject message may include a cause code.

A value of the cause code may be set to '34' indicating service option temporarily out of order.

The method may further comprise receiving, by the MME, a packet data network (PDN) connection request message from the user equipment (UE); transmitting, by the MME, a session request message for the packet data network (PDN) connection to a serving gateway; and receiving, by the MME, a session response message from the serving gateway.

The packet data network (PDN) connection request message may include an access point name (APN).

The bearer setup request may include a TEID (tunnel endpoint ID).

The bearer setup request may be used for establishment of a default bearer.

The core network (CN) entity may include the MME, or a local gateway of the LIPA PDN connection.

In the method, transmitting, by the MME, a delete session request to a serving gateway; and receiving, by the MME, a delete session response from the serving gateway may be further included.

In another aspect, the method comprises receiving, by a mobility management entity (MME) of the wireless network, a packet data network (PDN) connection request message for a packet data network connection based on local Internet protocol access (LIPA) from a user equipment (UE); transmitting, by the MME, a session request message for packet data network connection to a serving gateway; receiving, by the MME, a session response message from the serving gateway; receiving, by the MME, a handover indication message from a source base station or a target base station; transmitting, by the MME, a packet data network (PDN) connection reject message to the UE if the UE performs the handover; and releasing, by the MME, a network resource for the packet data network (PDN) connection based on local Internet protocol access (LIPA) if the UE performs the handover.

The handover indication message may be a handover required message transmitted by the source base station via an S1 interface.

The handover indication message may be a path switch request message transmitted by the target base station via an X2 interface.

The packet data network (PDN) connection reject message may include a cause code.

A value of the cause code may be set to '34' indicating service option temporarily out of order.

DESCRIPTION OF EXEMPLARY EMBODIMENTS

The technology described below can be used in various wireless communication systems such as code division multiple access (CDMA), a frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The OFDMA can be implemented with a radio technology such as institute of electrical and electronics engineers (IEEE) 802.11 (Wi-Fi), IEEE 802.16 (WiMAX), IEEE 802-20, evolved UTRA (E-UTRA), etc. The UTRA is a part of a universal mobile telecommunication system (UMTS). The $3^{rd}$ generation partnership project (3GPP) long term evolution (LTE) is a part of an evolved UMTS (E-UMTS) using the E-UTRA. The 3GPP LTE uses the OFDMA in the downlink and uses the SC-FDMA in the uplink. For clarity of explanation, the following description will focus on the 3GPP LTE (or the 3GPP LTE-A). However, the technical features of this description are not limited thereto.

Figure 1:
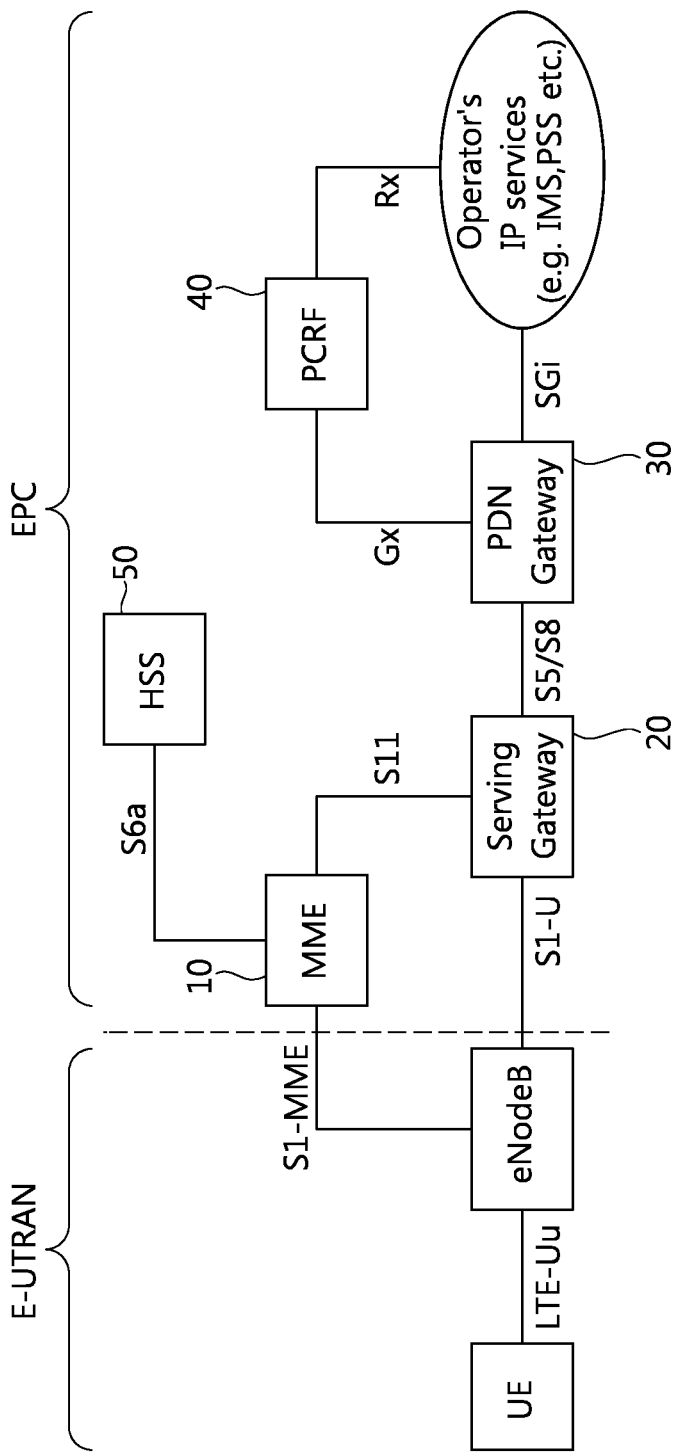
FIG. 1 is a view illustrating an Evolved Packet System which is associated with the Long Term Evolution (LTE) system.

FIG. 1 is a view illustrating an Evolved Packet System which is associated with the Long Term Evolution (LTE) system. The LTE system aims to provide seamless Internet Protocol (IP) connectivity between a user equipment (UE) and a pack data network (PDN), without any disruption to the end user's application during mobility. While the LTE system encompasses the evolution of the radio access through an E-UTRAN (Evolved Universal Terrestrial Radio Access Network) which defines a radio protocol architecture between a user equipment and a base station, it is accompanied by an evolution of the non-radio aspects under the term 'System Architecture Evolution' (SAE) which includes an Evolved Packet Core (EPC) network. The LTE and SAE comprise the Evolved Packet System (EPS).

The EPS uses the concept of "EPS bearers" to route IP traffic from a gateway in the PDN to the UE. A bearer is an IP packet flow with a specific Quality of Service (QoS) between the gateway and the UE. The E-UTRAN and EPC together set up and release the bearers as required by applications.

The EPC, which is also referred to as the core network (CN), controls the UE and manages establishment of the bearers. As depicted in FIG. 1, the node (logical or physical) of the EPC in the SAE includes a Mobility Management Entity (MME) 10, a PDN gateway (PDN-GW or P-GW) 30, a Serving Gateway (S-GW) 20, a Policy and Charging Rules Function (PCRF) 40, a Home subscriber Server (HSS) 50, etc.

The MME 10 is a control node which processes the signaling between the UE and the CN. The protocols running between the UE and the CN are known as the Non-Access Stratum (NAS) protocols. Examples of functions supported by the MME 10 include functions related to bearer management, which includes the establishment, maintenance and release of the bearers and is handled by the session management layer in the NAS protocol, and functions related to connection management, which includes the establishment of the connection and security between the network and UE, and is handled by the connection or mobility management layer in the NAS protocol layer.

The S-GW 20 serves as the local mobility anchor for the data bearers when the UE moves between eNodeBs. All user IP packets are transferred through the S-GW 20. The S-GW 20 also retains information about the bearers when the UE is in an idle state (known as ECM-IDLE) and temporarily buffers downlink data while the MME initiates paging of the UE to re-establish the bearers. Further, it also serves as the mobility anchor for inter-working with other 3GPP technologies such as GPRS (General Packet Radio Service) and UMTS (Universal Mobile Telecommunications System).

The P-GW 30 serves to perform IP address allocation for the UE, as well as QoS enforcement and flow-based charging according to rules from the PCRF 40. The P-GW 30 performs QoS enforcement for Guaranteed Bit Rate (GBR) bearers. It also serves as the mobility anchor for inter-working with non-3GPP technologies such as CDMA2000 and WiMAX networks.

The PCRF 40 serves to perform policy control decision-making, as well as for controlling the flow-based charging functionalities.

The HSS 50, which is also referred to as a Home Location Register (HLR), contains users' SAE subscription data such as the EPS-subscribed QoS profile and any access restrictions for roaming. Further, it also holds information about the PDNs to which the user can connect. This can be in the form of an Access Point Name (APN), which is a label according to DNS (Domain Name system) naming conventions describing the access point to the PDN, or a PDN Address which indicates subscribed IP addresses.

Between the EPS network elements shown in FIG. 1, various interfaces such as an S1-U, S1-MME, S5/S8, S11, S6a, Gx, Rx and SGi are defined.

Figure 2:
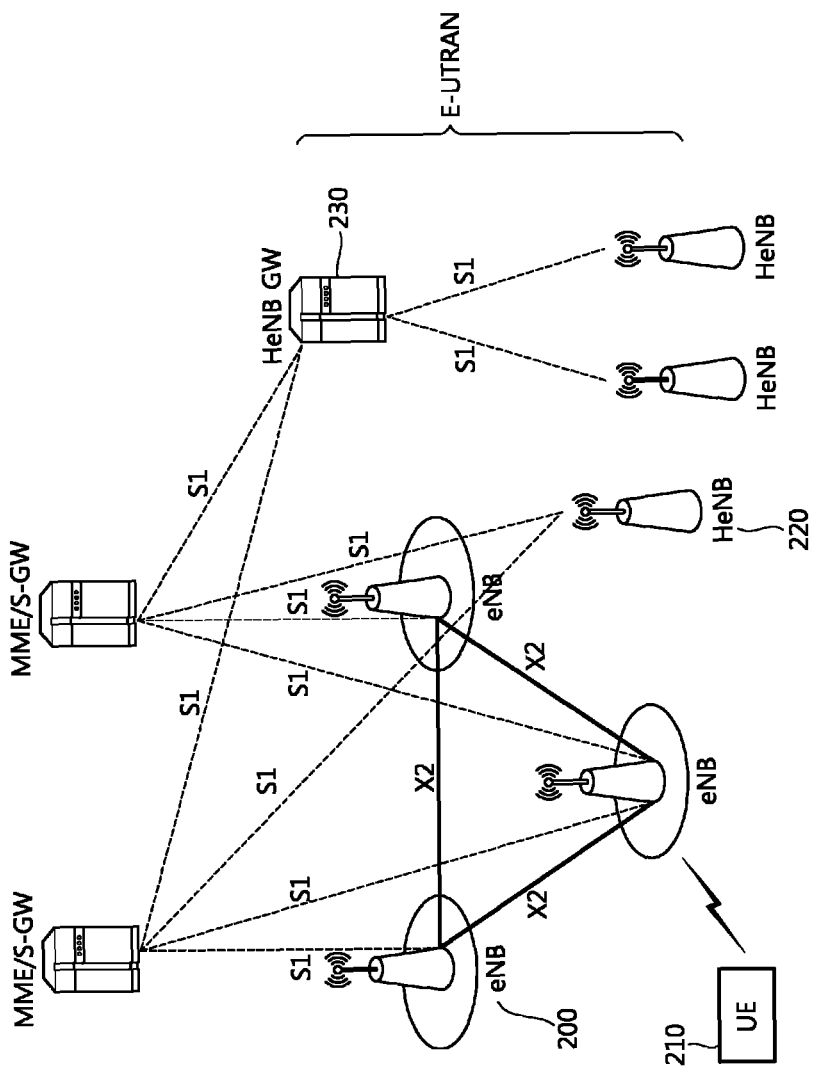
FIG. 2 is a view illustrating an overall architecture of the E-UTRAN to which the following technical features are applied.

FIG. 2 is a view illustrating an overall architecture of the E-UTRAN to which the following technical features are applied.

The E-UTRAN includes at least one eNB (evolved-Node B) 200 providing a user plane and a control plane towards a user equipment (UE) 210. The UE can be fixed or mobile and can be referred to as another terminology, such as a MS (Mobile Station), a UT (User Terminal), an SS (Subscriber Station), an MT (mobile terminal), a wireless device, or the like. The eNB 200 may be a fixed station that communicates with the UE 100 and can be referred to as another terminology, such as a base station (BS), a NB (NodeB), a BTS (Base Transceiver System), an access point, or the like.

The protocols running between the eNBs 200 and the UE 210 are known as the Access Stratum (AS) protocols.

The BSs (or eNBs) 200 are interconnected with each other by means of an X2 interface. The BSs 200 are also connected by means of the S1 interface to the aforementioned EPC (Evolved Packet Core) elements, more specifically to the Mobility Management Entity (MME) by means of the S1-MME and to the Serving Gateway (S-GW) by means of the S1-U.

The E-TURAN architecture depicted in FIG. 2 may further comprise a Home evolved Node B (HeNB) 220 and an HeNB GW (HeNB gateway) 230.

The HeNB 220 is fundamentally similar to a typical eNB, but it can be simple devices typically installed by end users themselves. The HeNB 220 is also referred to as a HNB (home NB), a femto cell, a home cellular base station, etc. The HeNB 220 behaves like a cellular network with respect to communication devices, which can use their regular cellular network radio interface to communicate with them, and connects to a cellular network operator's core network through the alternate network access, such as Internet access via fiber, DSL or cable subscriptions. In general, the HeNB 220 has a low radio transmission output power compared to the BS owned by mobile communication service providers. Therefore, the service coverage provided by the HeNB 220 is typically smaller than the service coverage provided by the eNB 200. Due to such characteristics, the cell provided by the HeNB 220 is classified as a femto cell in contrast to a macro cell provided by the eNB 200 from a standpoint of the service coverage.

The HeNB may have functions related to CSG services, which are services that can be provided only to a certain group of subscribers, to improve quality of service. A base station (BS) capable of providing CSG services is referred to as a Home eNodeB (HeNB), and a cell serving CSG members is referred to as a CSG cell. The basic requirements regarding CSG services are as disclosed in 3GPP TS 22.220 V10.0.0 (2009-10) "Service requirements for Home NodeBs and Home eNodeBs (Release 9)."

Hereinafter, the concept of an APN (Access Point Name) will be explained.

The APN is the name of an access point previously defined within a network to find a P-GW when a requested service is passed through the P-GW to access a network. The APN is provided to the UE, and the UE determines a suitable P-GW for data transmission and reception based on the APN.

The APN can be a configurable network identifier used by a mobile device when connecting to a carrier. The carrier will then examine this identifier to determine what type of network connection should be created, for example: what IP addresses should be assigned to the wireless device, what security methods should be used, and how/or if, it should be connected to some private customer network. More specifically, the APN identifies an IP Packet Data Network (PDN), that a mobile data user wants to communicate with. In addition to identifying the PDN, the APN may also be used to define the type of service. The APN is used in various access networks such as a general packet radio service (GPRS) and an evolved packet core (EPC).

Hereinafter, the concept of an EPS bearer will be explained.

The EPS (Evolved Packet System) uses the concept of EPS bearers to route IP traffic from a gateway in the PDN (pack data network) to the UE. The EPS bearer is an IP packet flow with a Quality of Service (QoS) between the gateway and the UE. The E-UTRAN and EPC (Evolved Packet Core) together set up and release EPS bearers as required by applications.

The EPS bearer is typically associated with the QoS. Multiple bearers can be established for a user in order to provide different QoS streams or connectivity to different PDNs. For example, a user might be engaged in a voice (e.g., VoIP) call while at the same time performing web browsing or File Transfer Protocol (FTP) download. A VoIP bearer would provide the necessary QoS for the voice call, while a best-effort bearer would be suitable for the web browsing or FTP session.

Broadly, EPS bearers can be classified into two categories based on the nature of the QoS they provide. The two categories are Minimum Guaranteed Bit Rate (GBR) bearers and Non-GBR bearers. The GBR bearers have an associated GBR value for which dedicated transmission resources are permanently allocated at bearer establishment/modification. Bit rates higher than the GBR may be allowed for a GBR bearer if resources are available. On the other hand, the non-GBR bearers do not guarantee any particular bit rate. For these bearers, no bandwidth resources are allocated permanently to the bearer.

Further, EPS bearers can be classified in a different manner. In particular, the EPS bearers can be classified into a default bearer and a dedicated bearer. The default bearer is an EPS bearer which is first established for a new PDN connection and remains established throughout the lifetime of the PDN connection. The default bearer gets established with every new PDN connection. Namely, when the UE connects to the P-GW by means of a procedure called "Initial Attach," a new or default bearer is created and its context remains established throughout the lifetime of that PDN connection. The UE can be attached to more than one P-GW, and thus the UE can have more than one default bearer. The default EPS bearer is a non-GBR bearer and associated with a best effort QoS, wherein the best effort QoS is the lowest of all QoS traffic classes. Bearers which are not created at the initial attach procedure can be referred to as dedicated bearers. The dedicated bearer is an EPS bearer that is associated with uplink packet filters in the UE and downlink packet filters in the PDN GW where the filters only match certain packets.

Hereinafter, the relationship of the EPS bearer and lower layer bearers such as S1, S5/S8, radio bearers and E-RAB will be explained.

Figure 3:
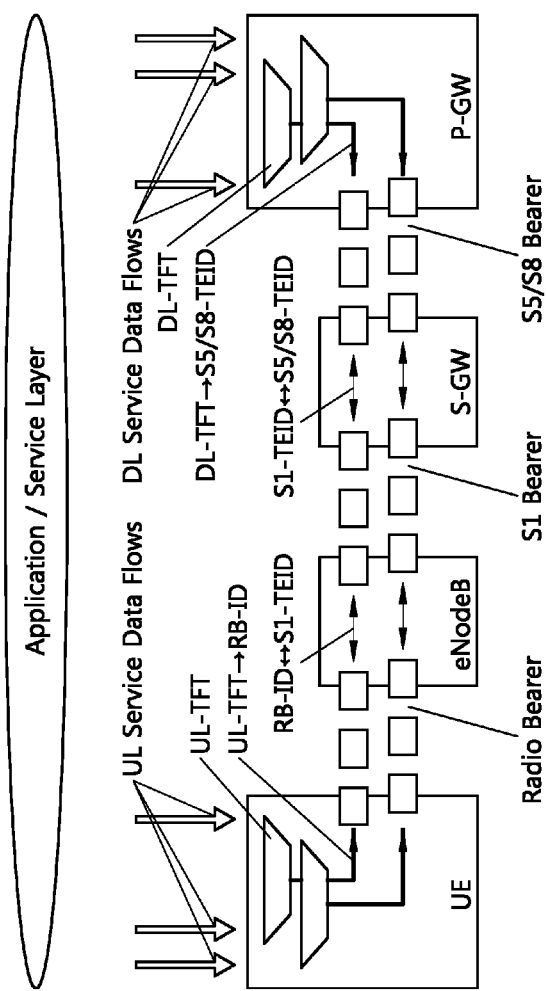
FIG. 3 is a view illustrating EPS bearers crossing multiple interfaces.

The EPS bearer has to cross multiple interfaces as shown in FIG. 3—the S5/S8 interface from the P-GW to the S-GW, the S1 interface from the S-GW to the eNodeB, and the radio interface (also known as the LTE-Uu interface) from the eNodeB to the UE. Across each interface, the EPS bearer is mapped onto a lower layer bearer, each with its own bearer identity. Each node keeps track of the binding between the bearer IDs across its different interfaces.

An S5/S8 bearer transports the packets of the EPS bearer between the P-GW and the S-GW. The S-GW stores a one-to-one mapping between an S1 bearer and an S5/S8 bearer. Each bearer is identified by the GTP (GPRS Tunneling Protocol) based Tunnel Endpoint ID (also known as a TEID) across both interfaces.

An S1 bearer transports the packets of an EPS bearer between the S-GW and the eNodeB. A radio bearer (also known as a radio data bearer) transports the packets of an EPS bearer between the UE and the eNodeB. Each bearer is identified by the GTP (GPRS Tunneling Protocol) tunnel endpoint ID (also known as a TEID or a GTP TEID) across both interfaces.

Further, the concept of the E-RAB (E-UTRAN Radio Access Bearer) may be used. An E-RAB transports the packets of an EPS bearer between the UE and the EPC (GPRS Tunneling Protocol), more specifically to the S-GW through eNB. When an E-RAB exists, there is a one-to-one mapping between this E-RAB and an EPS bearer.

IP packets mapped to the same EPS bearer receive the same bearer-level packet forwarding treatment (e.g., scheduling policy, queue management policy, rate shaping policy, or RLC configuration). Providing different bearer-level QoS thus requires that a separate EPS bearer is established for each QoS flow, and user IP packets must be filtered into the different EPS bearers.

Hereinafter, the concept of TEID will be explained.

Figure 4:
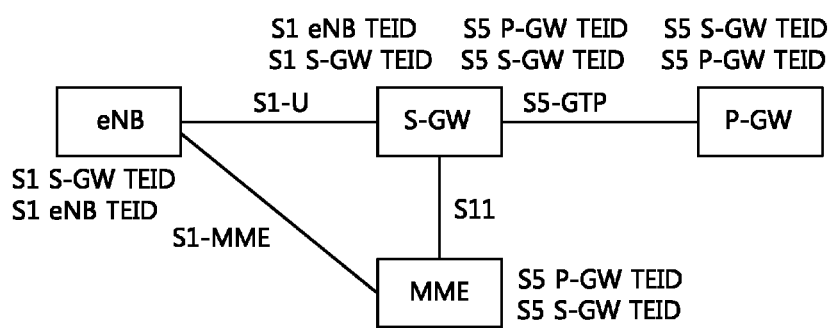
FIG. 4 is a block diagram illustrating relationship between TEIDs.

As discussed above, TEIDs (tunnel endpoint IDs) are used to define bearers which cross the multiple interfaces. FIG. 4 is a block diagram showing relationship between TEIDs. FIG. 4 shows the user-plane information, stored in various EPS nodes.

An S1 eNB TED is a tunnel endpoint identifier used in the GTP protocol on the S1 interface. The 51 eNB TEID is assigned by the eNB and stored in the eNB and S-GW.

An S1 S-GW TEID is a tunnel endpoint identifier used in the GTP protocol on the S1 interface. It is assigned by the S-GW and stored in the eNB, S-GW and MME.

An S5 S-GW TEID is a tunnel endpoint identifier used in the GTP protocol on the S5 interface. It is assigned by the S-GW and stored in the S-GW and P-GW.

An S5 P-GW TEID is a tunnel endpoint identifier used in the GTP-U protocol on the S5 interface. It is assigned by the PGW and stored in the S-GW, P-GW and MME.

Hereinafter, the concept of LIPA (local IP access) will be explained. The LIPA is a technical feature of mobile communication networks, which is introduced in Release-10 of 3GPP. (See in particular Section 5.7.1 of 3GPP TS 22.220 V10.0.0, 2009-09). The LIPA enables an IP-capable UE connected via the HeNB to access other IP-capable entities in the same residential/enterprise IP network without the user plane traversing the mobile operator's network except HeNB subsystem. The LIPA provides access from a communication device to a home-based network (for any kind of IP based services, not only for voice) through the femto cell or the HeNB. The home-based network is in fact any kind of local network (e.g., it can be in a residential or corporate environment, or a public hotspot), i.e., it is not necessarily a network in the home of an individual. Namely, the term "home" has to be understood in a broad sense, the same applies to other expressions such as "home" cellular base station. Further, the "home" network may include an office network in a company.

The LIPA is a technology for connecting the HeNB to a local network such as the "home" based network, and assigning an IP address to the UE within the HeNB, thereby allowing the UE to be connected to the local network through the HeNB. The network system to which the LIPA is applied generally comprises a Local Gateway (L-GW). The local gateway (L-GW) denotes a gateway for enabling the LIPA through the HeNB. In general, the L-GW may be collocated with the HeNB. The L-GW enables to create a bearer between the HeNB and the local network, and to allow data transmission through the created bearer.

Figure 5:
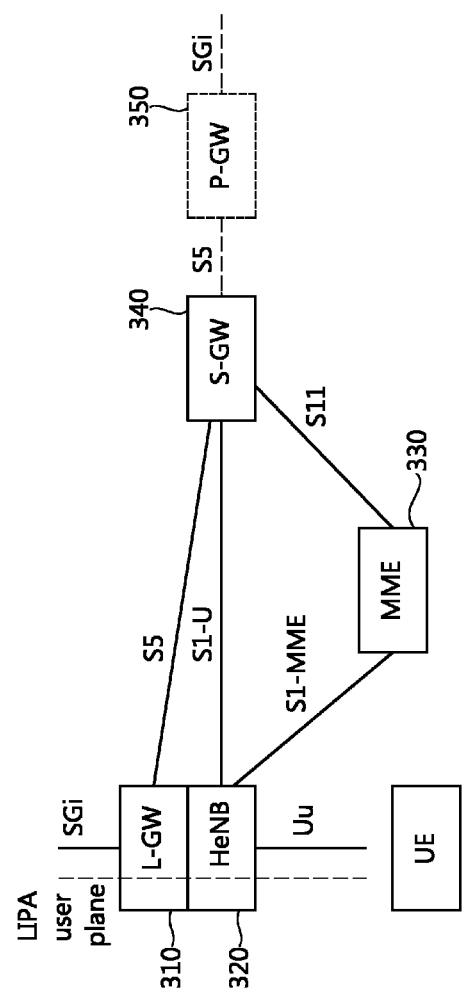
FIG. 5 is a block diagram illustrating an LIPA architecture to which the following technical features are applied.

FIG. 5 is a block diagram illustrating the LIPA architecture to which the following technical features are applied.

A subsystem including the HeNB 320 and the L-GW 310 can be referred to as an HeNB subsystem. As shown in FIG. 5, the HeNB subsystem is connected by means of the S1 interface to the EPC, more specifically to the MME 330 by means of the S1-MME interface and to the S-GW 340 by means of the S1-U interface. When LIPA is activated, the L-GW 310 has the S5 interface with the S-GW 340.

In the mean time, the S-GW 340 can be connected by means of the S5 interface to the PDN GW (or P-GW) 350 for general traffic which is not forwarded to the local network at home or in company. The general traffic can be forwarded to the mobile communication operator's network through the P-GW 350. On the other hand, local traffic to be forwarded to the local network is forwarded to the L-GW 310 through the HeNB 320.

As explained above, the LIPA (Local IP Access) is achieved using the L-GW colocated with the HeNB. LIPA is established by the UE requesting a new PDN connection to an APN (Access Point Name) for which LIPA is permitted, and the network selecting the L-GW associated with the HeNB and enabling a direct user plane path between the L-GW and the HeNB. The HeNB supporting the LIPA function includes the L-GW address to the MME in every INITIAL UE MESSAGE and every UPLINK NAS TRANSPORT control message.

When the LIPA is activated, a correlation identifier (correlation ID) can be further used. The correlation ID is an ID used in the HeNB for matching the radio bearers with the direct user plane path connections from the collocated L-GW. The direct user plane path between the HeNB and the collocated L-GW is enabled with a correlation ID parameter that is associated with the default EPS bearer on a PDN connection used for Local IP Access. Upon establishment of the default EPS bearer, the MME sets the correlation ID equal to the P-GW TEID (Tunnel Endpoint ID) or the P-GW GRE (Generic Routing Encapsulation) key. The correlation ID is then signaled by the MME to the HeNB as part of E-RAB establishment and is stored in the E-RAB context in the HeNB.

Figure 6:
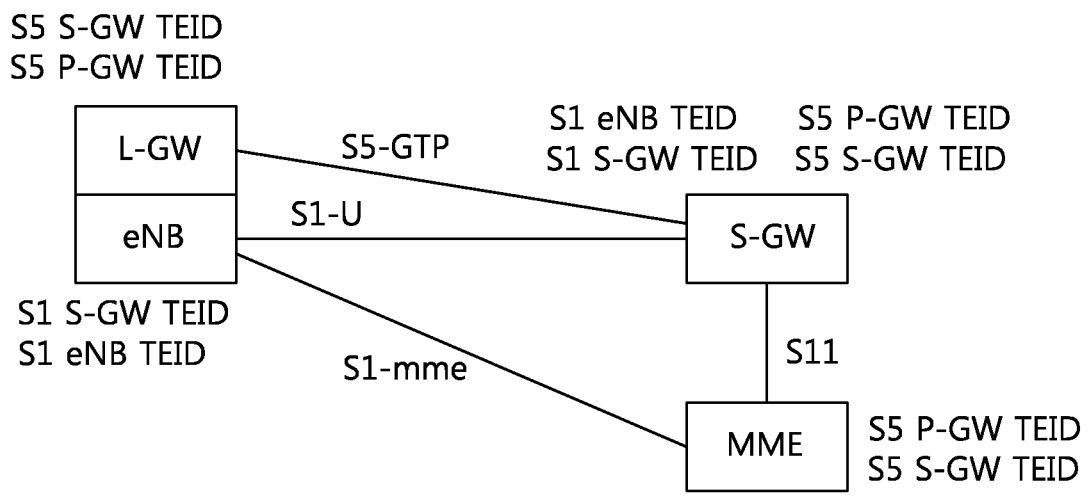
FIG. 6 is a block diagram illustrating relationship between TEIDs in a network system in which the LIPA is enabled.

FIG. 6 is a block diagram illustrating relationship between TEIDs in a network system in which the LIPA is enabled. As shown in FIG. 6, an S1 eNB TEID is a tunnel endpoint identifier used in the GTP protocol on the S1 interface, assigned by the eNB, and stored in the eNB and S-GW. An S1 S-GW TEID is a tunnel endpoint identifier used in the GTP protocol on the S1 interface, assigned by the S-GW, and stored in the eNB, S-GW and MME. An S5 S-GW TEID is a tunnel endpoint identifier used in the GTP protocol on the S5 interface, assigned by the S-GW, and stored in the S-GW and L-GW. An S5 P-GW TEID is a tunnel endpoint identifier used in the GTP-U protocol on the S5 interface, assigned by the L-GW, and stored in S-GW, L-GW and MME.

Hereinafter, the concept of the mobility of the LIPA PDN connection is explained.

The 3GPP Release 10 does not support the mobility of the LIPA PDN connection, and thus the LIPA PDN connection is released when the UE moves away from the current or source H(e)NB. Before starting the handover procedure, the H(e)NB shall request using an intra-node signaling the collocated L-GW to release the LIPA PDN connection. The H(e)NB determines that the UE has a LIPA PDN connection from the presence of the correlation ID in the UE E-RAB context. The L-GW shall then initiate and complete the release of the LIPA PDN connection using the PDN GW initiated bearer deactivation procedure. The H(e)NB dose not proceed with the handover preparation procedure towards the target station until the UE's E-RAB context is clear for the Correlation ID.

Based on the 3GPP Release 10, during the handover, the source MME verifies that the LIPA PDN connection has been released. Further, when the handover is the S1-based handover, the source MME shall reject the handover. In addition, when the handover is X2-based handover, the MME shall send a Path Switch Request Failure message to the target HeNB.

Based on the 3GPP Release 10, the direct signaling from the H(e)NB to the L-GW is only possible since mobility of the LIPA PDN connection is not supported in the 3GPP Release 10.

Although an initial specification of the LIPA is already available, the LIPA is still being specified as not all issues have been addressed. For example, the current specification fails to address an abnormal situation associated with the mobility of the LIPA PDN connection. Hereinafter, the above-mentioned abnormal situation will be explained in detail.

Figure 7:
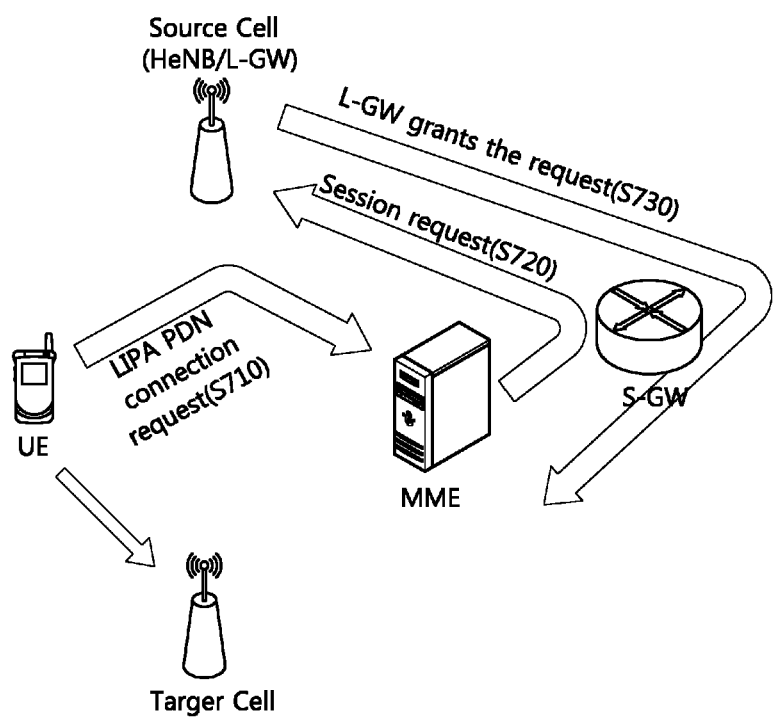
FIG. 7 illustrates an abnormal situation where the PDN connectivity request is made in a target cell.

FIG. 7 illustrates an abnormal situation where the PDN connectivity request is made in a source cell, which is preparing a handover of the UE. The UE which is about to handover can transmit a LIPA PDN connection request to the MME (S710). As shown in FIG. 7, the LIPA PDN connection request is transmitted to the MME through the HeNB to as a NAS signalling (or NAS protocol message), which is not subject to examination (or further processing) of the source eNB. The MME transmits a session request to the L-GW, thereby creating a session for the local IP access (S720). As shown in FIG. 7, the session request is transmitted to the L-GW through the S-GW with the UE's IMSI (International Mobile Subscriber ID) as an identifier. In response to the request, the L-GW may grant the request and allow the creation of the session because the HeNB/L-GW is not aware the IMSI belonging to the HE under handover preparation (S730). As shown in FIG. 7, the grant is transmitted to the MME through the S-GW.

As discussed above, the current specification does not allow the LIPA PDN connection to be carried over across cells. Under the current specification, the L-GW colocated with the HeNB is responsible to tear down the UE's LIPA connection before the UE moves to a target cell. However, the abnormal situation in which the L-GW inadvertently grants the UE's LIPA PDN connectivity request may occur during handover preparation, because the L-GW colocated with the HeNB has not correlated the UE's IMSI with the UE's radio identity during the steps S710 to S730.

If the LIPA PDN connection is inadvertently granted by the L-GW not knowing the UE requesting the PDN connection is about to handover, the MME will then base on the S-GW's response to transmit an ACTIVATE DEFAULT EPS BEARER CONTEXT REQUEST message to the UE. The ACTIVATE DEFAULT EPS BEARER CONTEXT REQUEST message is a NAS (Non-Access Stratum) massage and is used to activate the default EPS bearer context. The ACTIVATE DEFAULT EPS BEARER CONTEXT REQUEST message is included in an S1AP E-RAB SETUP REQUEST message, which contains the correlation ID and is transmitted to the HeNB, such that the HeNB can forward the ACTIVATE DEFAULT EPS BEARER CONTEXT REQUEST message to the UE. The S1AP E-RAB SETUP REQUEST message is used to request the setup of a radio access bearer, which is also referred to as an E-RAB (E-UTRAN Radio Access Bearers). The S1AP E-RAB SETUP REQUEST message is an S1AP (S1 Application Part) message which is defined in the S1 AP (i.e., the control plane signaling protocol between eNB/HeNB and MME).

Only after the HeNB receives the S1AP message (i.e., the S1AP E-RAB SETUP REQUEST message), the HeNB colocated with the S-GW notices the correlation between the PDN connection requested by the UE and the UE's radio identity. The HeNB then sends an E-RAB SETUP RESPONSE, which is an S1AP message and which is transmitted in response to the E-RAB SETUP REQUEST, to the MME for indicating the failure. Thereafter, the HeNB does not forward the ACTIVATE DEFAULT EPS BEARER CONTEXT REQUEST message to the UE.

The current specification does not handle this abnormal situation. For example, if it is assumed that the HeNB sends a message (e.g., the E-RAB SETUP RESPONSE) for indicating that the handover is triggered by including a specific cause code, then the MME may, after handover, continue to setup the default bearer by resending the ACTIVATE DEFAULT EPS BEARER CONTEXT REQUEST message to the UE via the target HeNB. The above-mentioned operation of the MME is not desirable for a LIPA PDN connection, since the mobility of the LIPA PDN connection is limited.

Further, while it is possible for the MME to send the ACTIVATE DEFAULT EPS BEARER CONTEXT REQUEST for the LIPA PDN connection to the target HeNB after handover under the current 3GPP specification, such an operation of the MME is not desirable for a LIPA PDN connection, since the mobility of the LIPA PDN connection is limited.

The technology described below is to handle the above-mentioned abnormal situation. In the following embodiments, the MME becomes responsible to prevent the LIPA PDN connection being established in the target cell.

Further, given that the UE may not be aware the requested PDN is for LIPA, it is also desirable that the network can explicitly reject the request, either before or after the handover, to avoid the UE's retry.

Figure 8:
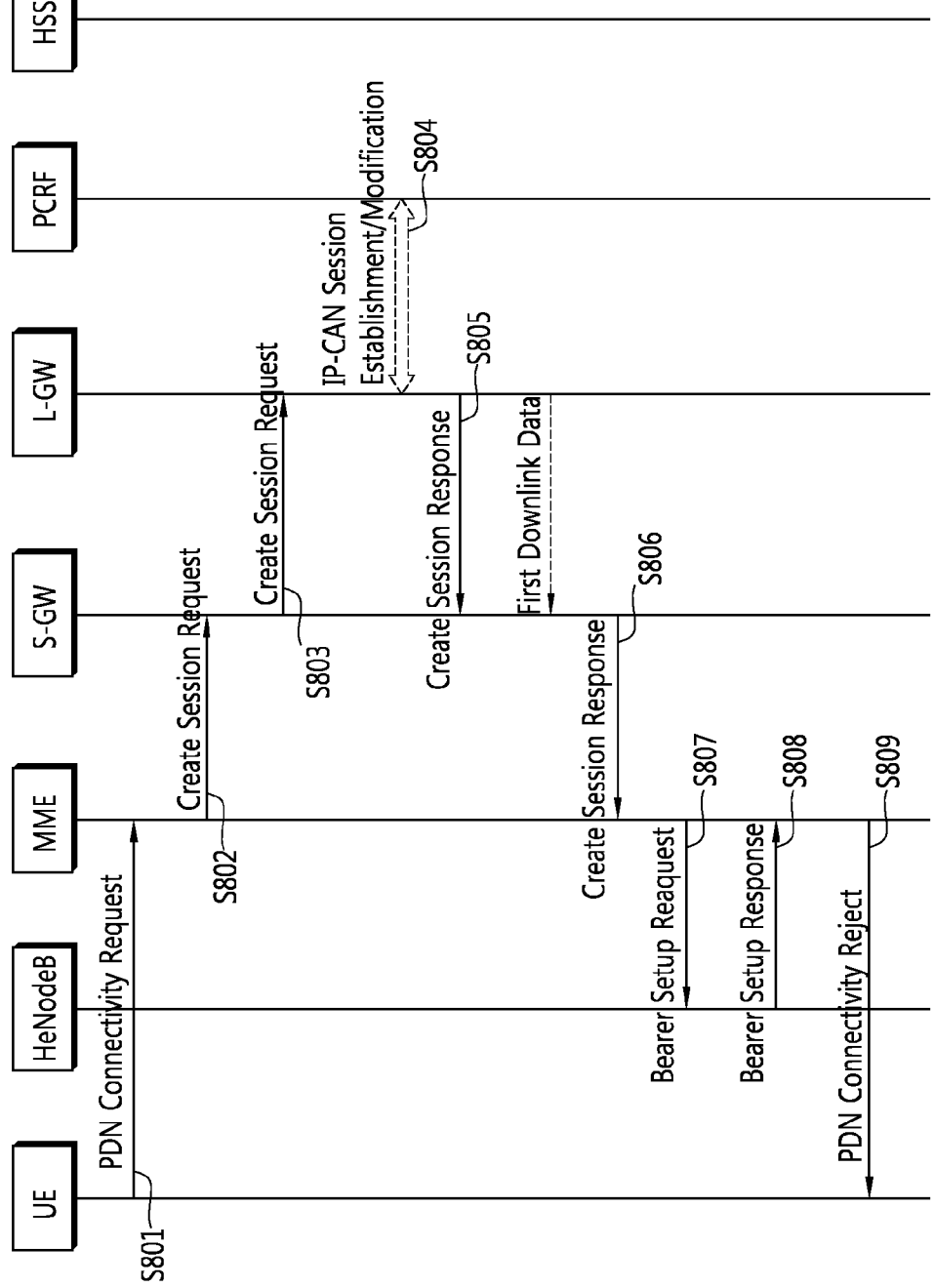
FIG. 8 is a flowchart illustrating a method of handling the LIPA PDN connectivity request during handover.

FIG. 8 is a flowchart illustrating a method of handling the LIPA PDN connectivity request during handover. The technical features depicted in FIG. 8 are related to a case where the MME is not aware of the UE's handover before responding the UE's PDN connectivity request.

In step S801, to establish the PDN connection, the UE transmits a PDN connection request message (i.e., PDN Connectivity Request) to the MME via the HeNB. The PDN Connectivity Request includes information on an APN (Access Point Name), a PDN Type, Protocol Configuration Options, a Request Type, or the like. The PDN type indicates the requested IP version (IPv4, IPv4v6, IPv6). The Protocol Configuration Options (PCOs) are used to transfer parameters between the UE and the PDN GW, and are sent transparently through the MME and the Serving GW. The Request Type indicates types (e.g., emergency, initial request, handover) of connections.

If the UE-provided APN is authorized for the LIPA, the MME authorizes the connection. Further, in step S802, the MME allocates a bearer ID and transmits a session request message (i.e., the Create Session Request) to the S-GW. Various information included in the Create Session Request is fully disclosed in Section 5.10.2 of 3GPP TS 23.401 V10.0.0 (2010-06) "Technical Specification Group Services and System Aspects; General Packet Radio Service (GPRS) enhancements for Evolved Universal Terrestrial Radio Access Network (E-UTRAN) access (Release 10)."

In steps S803 to S805, a Create Session Request and a Create Session Response are delivered between the S-GW and the L-GW to create a session for the LIPA.

In step S806, a session response message (i.e., the Create Session Response) is transmitted from the S-GW and contains various information. The various information included in the Create Session Response is fully disclosed in Section 5.10.2 of 3GPP TS 23.401 V10.0.0 (2010-06).

In step S807, the MME has not been informed by the HeNB about the UE's handover, which is currently pending. Thereafter, the MME transmits a bearer setup request message (i.e., the Bearer Setup Request) to the source HeNB (S807). The Bearer Setup Request is also referred to as S1AP E-RAB SETUP REQUEST message, which is an S1AP (S1 Application Part) message and is used to request the setup of a radio access bearer (i.e., E-RAB). As mentioned above, the S1AP E-RAB SETUP REQUEST message includes ACTIVATE DEFAULT EPS BEARER CONTEXT REQUEST message, which is a NAS (Non-Access Stratum) massage and is used to activate the default EPS bearer context.

In step S808, upon receiving the S1AP E-RAB SETUP REQUEST, the source HeNB may reject the S1AP E-RAB SETUP REQUEST by transmitting an S1AP E-RAB SETUP RESPONSE with a cause code indicating that handover is triggered. The HeNB can reject the S1AP E-RAB SETUP REQUEST because the HeNB collocated with the L-GW now learns that the LIPA PDN connection it just granted is originated from the UE which is about to handover, by considering the correlation ID included in the S1AP E-RAB SETUP REQUEST.

In step S809, upon receiving the S1AP E-RAB SETUP RESPONSE with the cause code indicating that handover is triggered, the MME now learns that the UE is preparing handover. Accordingly, the MME transmits a PDN connection reject message, which is also referred to as a PDN CONNECTIVITY REJECT, to the UE so that the LIPA PDN connection is not established in the target cell. When transmitting the PDN CONNECTIVITY REJECT, the MME includes a proper cause code which is indicted by a cause value. The PDN CONNECTIVITY REJECT may include cause information elements (IEs), which are also referred to as ESM (EPS Session Management) cause IEs, indicating ESM cause values. In one example, the MME may transmit the PDN CONNECTIVITY REJECT with the ESM cause value '34' which indicates 'a service option is temporarily out of order'.

Figure 9:
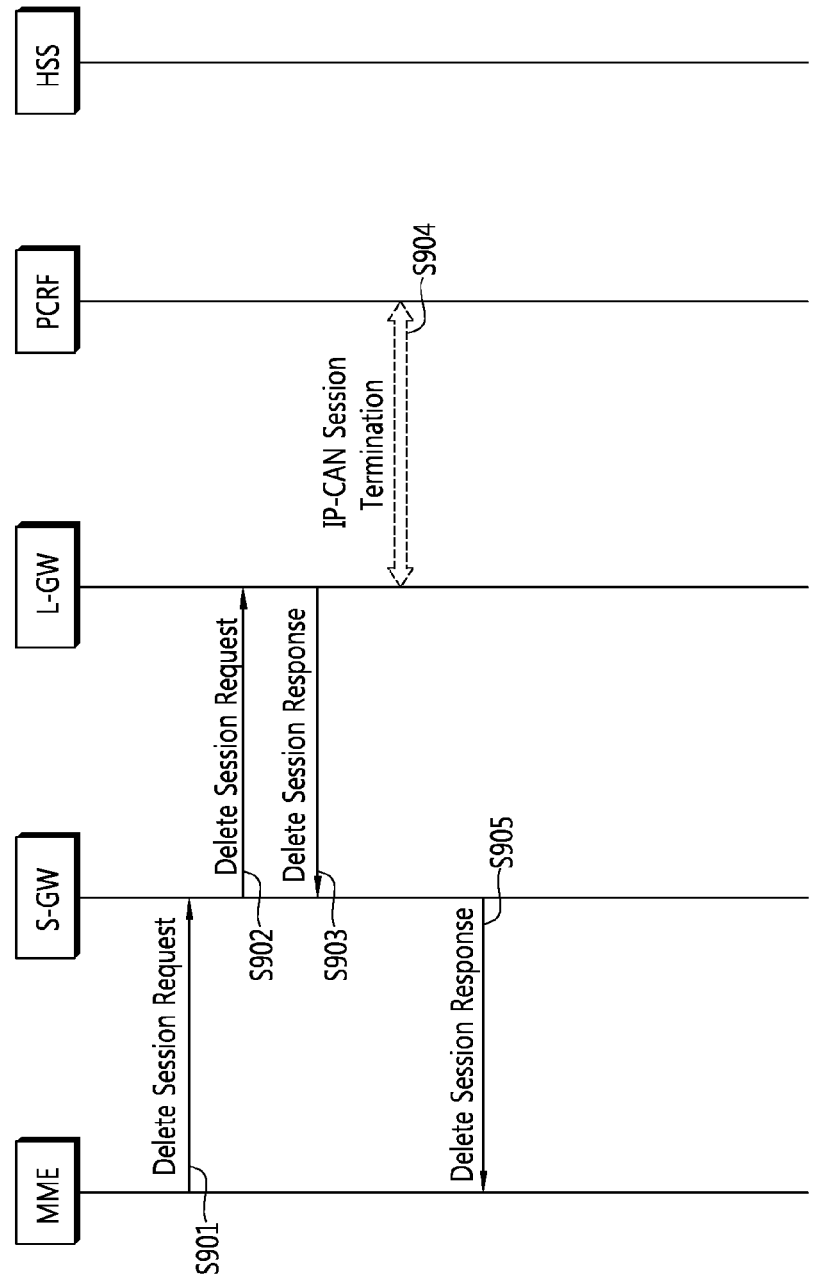
FIG. 9 is a flowchart illustrating an MME-requested PDN disconnection procedure.

The steps depicted in FIG. 8 may be used to allow the UE to request for connectivity to an additional PDN over E-UTRAN including allocation of a default bearer. Therefore, when the lower layer of NAS indicates that the HeNB rejected the establishment of the default bearer for the LIPA PDN connection due to a triggered handover, the MME can reject the PDN connectivity request procedure including the ESM cause value #34 "service option temporarily out of order" in the PDN CONNECTIVITY REJECT message. Further, the MME can release possibly allocated resources as depicted in FIG. 9. While the PDN CONNECTIVITY REJECT or PDN connection reject message is eventually delivered to the UE, it can be transmitted via the source HeNB or a target entity.

Although the MME does not result in the LIPA PDN connection established in the target cell, the LIPA PDN connection may be partially established between the core network (CN) entities such as the S-GW and the L-GW. Therefore, it is preferred to release the partially established LIPA PDN connection. The release process can be initiated by the MME, or the L-GW correlated with the HeNB.

FIG. 9 is a flowchart illustrating an MME-requested PDN disconnection procedure. The MME-requested PDN disconnection procedure is introduced in Section 5.10.3 of 3GPP TS 23.401 V10.0.0 (2010-06) "General Packet Radio Service (GPRS) enhancements for Evolved Universal Terrestrial Radio Access Network (E-UTRAN) access (Release 10)," which is incorporated by reference in its entirety herein.

In step S901, the MME transmits a delete session request to the S-GW for a particular PDN connection designated by the MME. In steps S902 to S904, the S-GW and the L-GW communicate a delete session request and a delete session response, thereby releasing the particular PDN connection designated by the MME. In step S905, the MME receives a delete session response from the S-GW in response to the delete session request.

Figure 10:
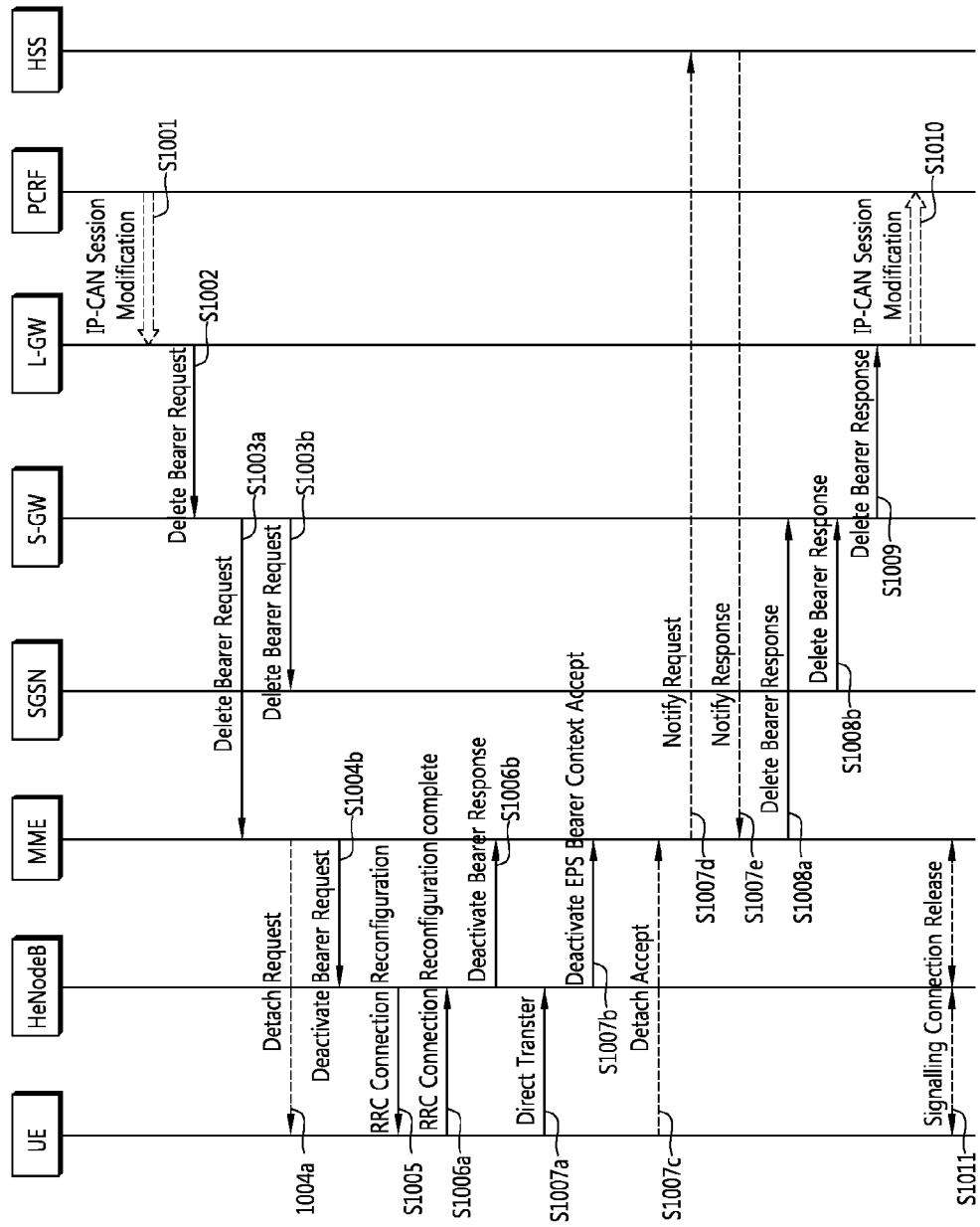
FIG. 10 is a flowchart illustrating an HeNB/L-GW requested PDN disconnection procedure.

FIG. 10 is a flowchart illustrating an HeNB/L-GW requested PDN disconnection procedure. The HeNB/L-GW requested PDN disconnection procedure is introduced in Section 5.4.4.1 of 3GPP TS 23.401 V10.0.0 (2010-06) "General Packet Radio Service (GPRS) enhancements for Evolved Universal Terrestrial Radio Access Network (E-UTRAN) access (Release 10)," which is incorporated by reference in its entirety herein.

In this particular case during handover preparation, steps S101, S1003b-S1007, and S1011 may not be performed. The L-GW initiates a bearer deactivation procedure by sending a delete bearer request to the S-GW, so that the S-GW can transmit additional signals to the other core network entities such as the MME.

As explained above, the examples depicted in FIG. 8 relates to a case where the MME is not aware of the UE's handover before responding to the UE's PDN CONNECTIVITY REQUEST. However, the technology described in this document can be applicable to a case where the MME is aware of the UE's handover before responding to the UE's PDN CONNECTIVITY REQUEST. The example of the case where the MME is aware of the UE's handover before responding to the UE's PDN CONNECTIVITY REQUEST is explained in FIG. 11.

Figure 11:
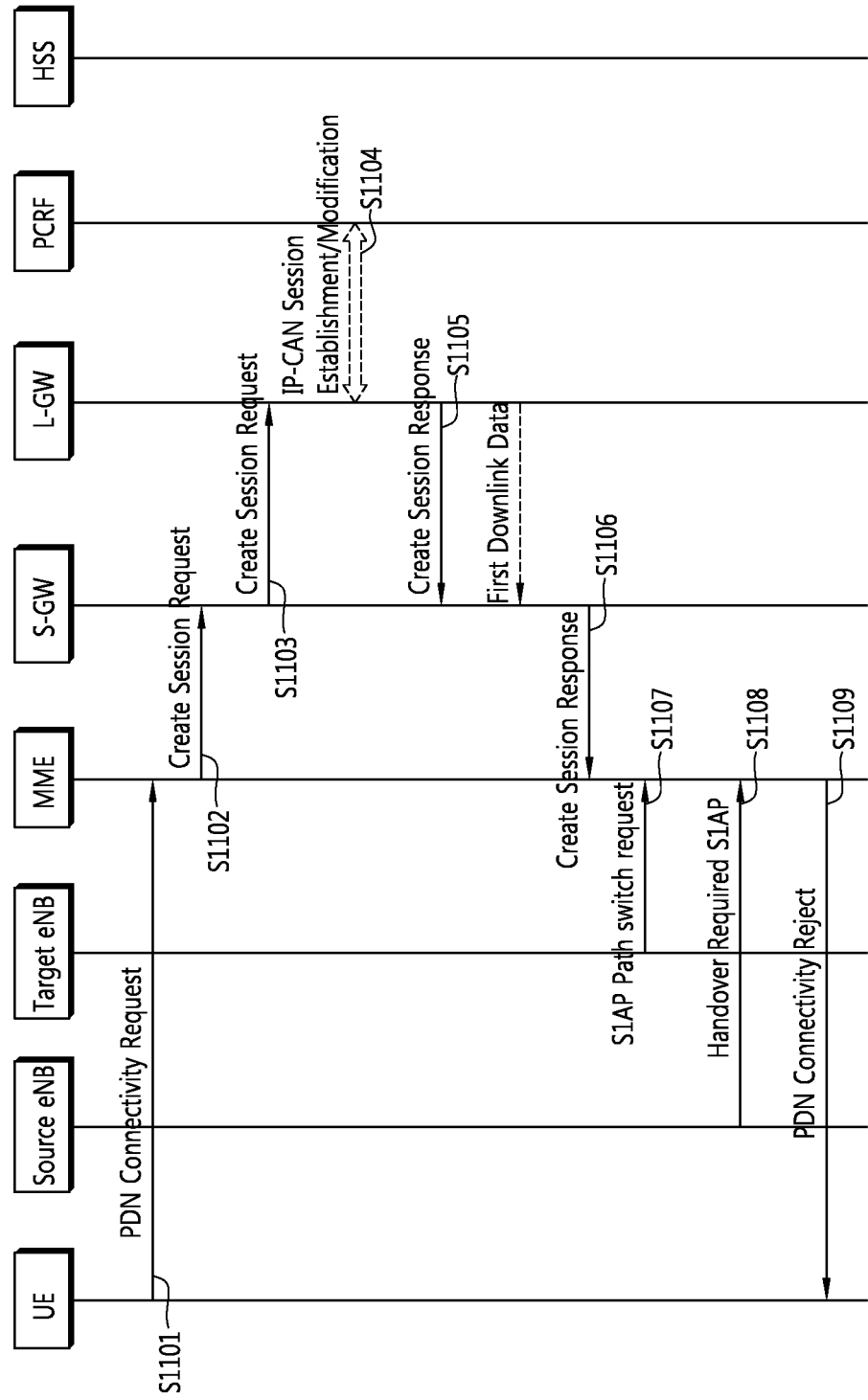
FIG. 11 is a flowchart illustrating a method of handling the LIPA PDN connectivity request during handover.

FIG. 11 is a flowchart illustrating a method of handling the LIPA PDN connectivity request during handover.

In step S1101, to establish the PDN connection, the UE transmits a PDN connection request message (i.e., PDN Connectivity Request) to the MME via a source eNB. As explained above, the PDN Connectivity Request message includes information on an APN (Access Point Name), a PDN Type, Protocol Configuration Options, a Request Type, or the like. The PDN type indicates the requested IP version (IPv4, IPv4v6, IPv6). The Protocol Configuration Options (PCOs) are used to transfer parameters between the UE and the PDN GW, and are sent transparently through the MME and the Serving GW. The Request Type indicates types (e.g., emergency, initial request, handover) of connections.

If the UE-provided APN is authorized for the LIPA, the MME authorizes the connection. Further, in step S1102, the MME allocates a bearer ID and transmits a session request message (i.e., Create Session Request) to the S-GW. In steps S1103 to S1105, a Create Session Request and a Create Session Response are communicated between the S-GW and the L-GW to create a session for the LIPA. In step S1106, a session response message (i.e., the Create Session Response) is transmitted from the S-GW and contains various information. The various information included in the Create Session Response is disclosed in Section 5.10.2 of 3GPP TS 23.401 V10.0.0 (2010-06).

The MME of FIG. 11 is aware of the UE's handover by receiving a handover indication message from a source eNB or target eNB. Based on the current 3GPP specification, the handover for UEs in active mode can be classified into an S1-based handover and an X2-based handover. For intra-LTE mobility, the X2-based handover is normally used for the inter-eNB handover. However, when there is no X2 interface between the eNBs, or if the source eNB has been configured to initiate handover towards a particular target eNB via the S1 interface, the S1-based handover will be triggered.

For S1-based handover, a HANDOVER REQUIRED message is sent by a source eNB to the MME (i.e., source MME). The HANDOVER REQUIRED message is transmitted via the S1AP (S1 Application Part) message. The detailed feature about the HANDOVER REQUIRED message is disclosed in Section 19.2.2.5.1 of 3GPP TS 36.300 V9.1.0 (2009-09).

For X2-based handover, a PATH SWITCH message is sent by a target eNB to the MME. The PATH SWITCH message is transmitted via the S1AP (S1 Application Part) message. The detailed feature about the HANDOVER REQUIRED message is disclosed in Section 19.2.2.5.5 of 3GPP TS 36.300 V9.1.0 (2009-09).

The MME of FIG. 11 is aware of the UE's handover by receiving the PATH SWITCH message from the target eNB when the X2-based handover occurs (S1107). Moreover, the MME of FIG. 11 is aware of the UE's handover by receiving the HANDOVER REQUIRED message from the source eNB when the S1-based handover occurs (S1108). In other words, the MME of FIG. 11 is aware of the UE's handover by receiving a handover indication message such as the PATH SWITCH or HANDOVER REQUIRED message.

For clarity, it is shown herein that the steps of S1107 and S1108 are performed after S1106. However, S1107 and S1108 can be performed in any phase of the UE-requested PDN connectivity procedure depicted in FIG. 11. Therefore, technical features of this document are not limited to the order of steps depicted in FIG. 11.

By receiving the handover indication message, the MME knows that the UE is preparing for finishing handover. Accordingly, in step S1109, the MME transmits a PDN connection reject message, which is also referred to as a PDN CONNECTIVITY REJECT, to the UE so that the LIPA PDN connection is not established in the target cell. When transmitting the PDN CONNECTIVITY REJECT, the MME includes a proper cause code which is indicted by a cause value. In one example, the MME may transmit the PDN CONNECTIVITY REJECT with the ESM cause value '34' which indicates 'a service option is temporarily out of order'. As explained above, the PDN CONNECTIVITY REJECT or PDN connection reject message includes any reject messages transmitted directly to the UE or delivered to the UE via another network entity.

Although the MME does not result in the LIPA PDN connection established in the target cell, the LIPA PDN connection may be partially established. Therefore, it is preferred to release the partially established LIPA PDN connection by the MME. The release procedure performed by the MME can be based on the procedure depicted in FIG. 9.

The foregoing examples depicted in FIGS. 8-11 can be modified as follows.

The Evolved Packet Core (EPC) network may further include an HeNB Gateway (HeNB GW) for controlling HeNBs. The HeNB GW is located between the HeNBs and the MME. When the HeNB GE is further included, handover between the HeNBs is controlled by the HeNB GW.

The HeNB GW can perform similar functionality to that of MME and HeNB in FIGS. 8-11. Accordingly, the HeNB GW may reject the S1AP E-RAB SETUP REQUEST message transmitted from the MME, if the HeNB GW has received a Path switch request from the target HeNB, the S1AP E-RAB SETUP REQUEST contains the correlation ID for the LIPA PDN connection, and the HeNB GW has not received a Path switch Ack message from the MME. This is to prevent from forwarding or relaying the S1AP E-RAB SETUP REQUEST, which is transmitted from the MME and originally intended for the source HeNB, to the target HeNB.

Alternatively, the HNB GW may always forward the S1AP message from the MME until it receives the Path switch Ack from MME. In this case, the HeNB GW starts forwarding/relaying S1AP messages to the target HeNB after it has received the Path switch Ack from the MME.

The foregoing examples depicted in FIGS. 8-11 relate to handover in the LTE system. However, the technical features in this document can be applicable to handover in 3G system such as UMTS (Universal Mobile Telecommunications System).

Figure 12:
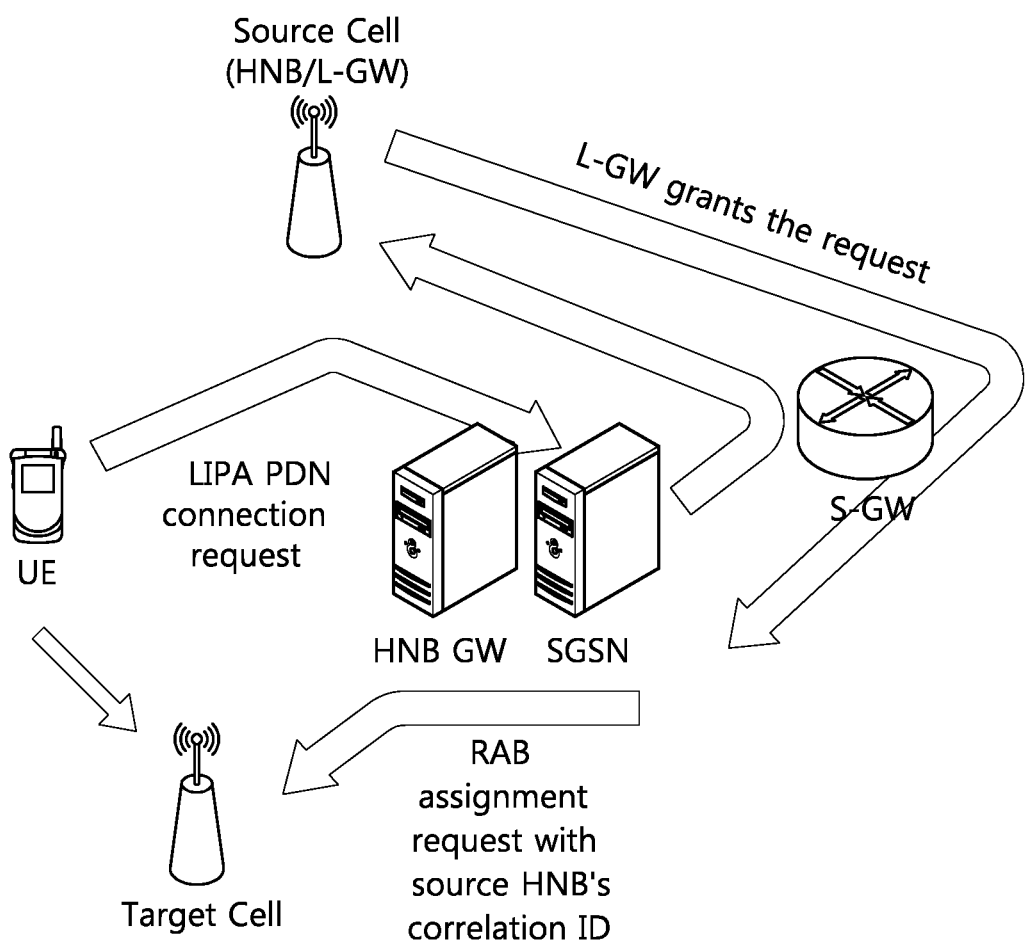
FIG. 12 is a diagram illustrating a method of handling LIPA PDN connection to request in 3G system.

FIG. 12 is a diagram illustrating a method of handling LIPA PDN connection request in 3G system.

When handing the LIPA PDN connectivity request in the 3G system, the above-mentioned abnormal situation may occur. Accordingly, the technical problems of the 3G system are similar to those of the LTE system. However, there is one more to consider, since the 3G system contains an HNB GW (Home NodeB Gateway) and an SGSN (Serving GPRS Support Node) instead of the MME. For an intra HNB GW handover, there is no signaling to the SGSN. As explained above, the MME is aware of the UE's handover (otherwise the RAB setup will be rejected by the source HeNB) in the LTE scenario. Further, the MME is also aware of the identity of the HeNB which the PDN connection request is coming from, and when the request is taking place (i.e. before or after handover). The MME can use the above information to stop sending RAB setup message to the target eNB if the LIPA PDN connection request occurs before handover.

On the other hand, in the scenario of the 3G system with handover under the same HNB GW, the SGSN does not know whether the UE is about to perform handover. Instead, HNB GW has such information that the UE is performing handover.

Further, in the scenario of the 3G system with handover under the same HNB GW, the HNB GW does not know when the request of LIPA PDN connection is transmitted because the request is a NAS message. Instead, SGSN has such information.

Due to the information regarding the LIPA PDN connection and the handover is distributed at two different network entities, the HNB GW does not know whether the RAB (Radio Access Bearers) assignment request message from the SGSN is associated with the LIPA PDN request which is transmitted before or after the handover.

Since two separate entities handle the LIPA PDN connection request and the handover, a problem such that a correlation ID given to a certain UE by the source HNB/L-GW may be relayed to the target BNB, and the target HNB may misconceive it as the correlation ID issued by the L-GW collocated with itself. For example, the HNB GW may forward the RAB assignment request for the first UE's LIPA bearer (granted by the L-GW at the source HNB) to the target HNB. The RAB assignment request contains the first correlation ID, which is the TEID in the first UE's S5 interface, in the source HNB/L-GW. The target HNB may be able to detect that it receives the RAB assignment request in error, if the first correlation ID (or TEID) is not in use in the target HNB/L-GW. However, if another UE (i.e., the second UE) not performing handover is also requesting the LIPA PDN connection, the same correlation ID for the first UE may be assigned for the second UE in the target HNB. In this case, if the correlation procedure for the second UE has not been completed, the target HNB will correlate the second UE's LIPA PDN connection with the first UE's RAN identity/bearer.

To solve the above-mentioned problem, the correlation ID may also contain the identity/address of L-GW which granted the LIPA PDN connection, in addition to the TEID. When the target HNB receives a RAB assignment message from the SGSN, if the L-GW identity/address in the correlation ID does not match its own, it rejects the request with the above-mentioned cause value or cause code.

In the mean time, the above-mentioned HeNB or HNB relates to a CSG (Closed Subscriber Group) and a CSG list update procedure. Hereinafter, the CSG and CSG list update procedure are explained.

The CSG indicates subscribers of an operator who are permitted to access one or more cells of the PLMN (Public Land Mobile Network) but which have restricted access. The CSG can be managed in the form of a list, which is referred to as a CSG list. Based on the current 3GPP specification, there are two types of CSG list, which are an Operator CSG List (OCL) and an Allowed CSG List (ACL), in the UE's non-volatile memory or in a universal subscriber identity module (USIM).

The ACL is a list stored in the UE, under both user and operator control, containing CSG identities (or CSG IDs) and associated PLMN identities of the CSGs to which the subscriber belongs. The OCL is a list stored in the UE, under exclusive operator control, containing the CSG identities and associated PLMN identities of the CSGs to which the subscriber belongs. Accordingly, the OCL is writable by operator only, but the ACL can be updated by UE when it is allowed to enters a CSG cell There is a mechanism defined by standards Section 3.1A of 3GPP TS 23.122 V10.2.0 (2010-12) to 'display CSGs found in OCL only', during manual CSG selection. This mechanism is defined to let UE only enter the CSG cells defined in OCL.

When UE checks a CSG cell with CSG ID in the ACL or OCL, it may select to the cell without notifying the network. If UE camps on a CSG cell in ACL but not in OCL, UE may miss any paging message, because network is expecting UE not to be in any CSG cells outside those defined in OCL, if 'display CSGs found in OCL only' is configured.

Based on the current 3GPP specification, the ACL is updated to be the same or a subset of OCL, when CSGs are removed from OCL, to avoid a CSG in the ACL but not in the OCL. There are two situations causing ACL not being a subset of OCL. The first situation is a situation in which entries in OCL are removed. The second situation is a situation in which entries are added to ACL but not to OCL when manual selection is not restricted to OCL. For the second scenario, when the configuration is changed to displaying CSGs in OCL only, the ACL remains unchanged. This produces the same issue as in the first scenario.

To solve the above technical problem, either the UE or network updates the USIM's ACL to be the same or a subset of OCL, when the configuration of manual selection is changed to 'display CSGs found in OCL only'.

Figure 13:
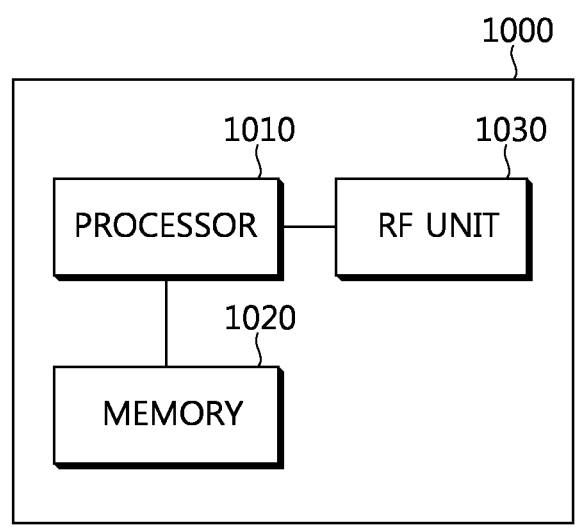
FIG. 13 is a block diagram showing a wireless apparatus to implement technical features of this description.

FIG. 13 is a block diagram showing a wireless apparatus to implement technical features of this description. This may be a part of a UE, an eNodeB/HeNodeB/HNodeB, or a core network (CN) entity. The wireless apparatus 1000 may include a processor 1010, a memory 1020 and a radio frequency (RF) unit 1030.

The processor 1010 may be configured to implement proposed functions, procedures and/or methods described in this description. Layers of the radio interface protocol may be implemented in the processor 1010. The processor 1010 may handle a procedure related to the LIPA PDN connection and ACL/OCL list. The memory 1020 is operatively coupled with the processor 1010, and the RF unit 1030 is operatively coupled with the processor 1010.

The processor 1010 may include application-specific integrated circuit (ASIC), other chipset, logic circuit and/or data processing device. The memory 1020 may include read-only memory (ROM), random access memory (RAM), flash memory, memory card, storage medium and/or other storage device. The RF unit 1030 may include baseband circuitry to process radio frequency signals. When the embodiments are implemented in software, the techniques described herein can be implemented with modules (e.g., procedures, functions, and so on) that perform the functions described herein. The modules can be stored in the memory 1020 and executed by the processor 1010. The memory 1020 can be implemented within the processor 1010 or external to the processor 1010 in which case those can be communicatively coupled to the processor 1010 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope of the present disclosure.

What has been described above includes examples of the various aspects. It is, of course, not possible to describe every conceivable combination of components or methodologies for purposes of describing the various aspects, but one of ordinary skill in the art may recognize that many further combinations and permutations are possible. Accordingly, the subject specification is intended to embrace all such alternations, modifications and variations that fall within the scope of the appended claims.

What is claimed is:

1. A method of processing data associated with handover in a wireless network transmitting a radio signal based on a number of orthogonal frequency division multiplexing (OFDM) symbols or single carrier frequency division multiple access (SC-FDMA) symbols, the method comprising:
   transmitting, by a mobility management entity (MME) of the wireless network, a bearer setup request for a packet data network (PDN) connection based on local Internet protocol access (LIPA) to a base station;
   receiving, by the MME, a bearer setup response from the base station;
   determining, by the MME, whether the bearer setup response indicates the base station rejects the bearer setup request for the PDN connection based on the LIPA due to a triggered handover of a user equipment (UE);
   if the base station is determined to reject the bearer setup request for the PDN connection based on the LIPA due to the triggered handover of the UE, transmitting, by the MME, a PDN connection reject message to the UE due to the triggered; and
   if the base station is determined to reject the bearer setup request for the PDN connection based on the LIPA due to the triggered handover of the UE, releasing, by a core network (CN) entity, a network resource for the PDN connection based on the LIPA.

2. The method of claim 1, wherein the PDN connection reject message includes a cause code.

3. The method of claim 2, wherein a value of the cause code is set to '34' indicating service option temporarily out of order.

4. The method of claim 1, further comprising:
   receiving, by the MME, a PDN connection request message from the UE;
   transmitting, by the MME, a session request message for the PDN connection to a serving gateway; and
   receiving, by the MME, a session response message from the serving gateway.

5. The method of claim 4, wherein the PDN connection request message includes an access point name (APN).

6. The method of claim 1, wherein the bearer setup request includes a tunnel endpoint ID (TEID) of a PDN gateway.

7. The method of claim 1, wherein the bearer setup request is used for establishment of a default bearer.

8. The method of claim 1, wherein the CN entity is the MME or a local gateway of the PDN connection based on the LIPA.

9. The method of claim 1, further comprising:
transmitting, by the MME, a delete session request to a serving gateway; and
receiving, by the MME, a delete session response from the serving gateway.

10. A mobility management entity (MME) communicating with a base station which transmits a radio signal based on a number of orthogonal frequency division multiplexing (OFDM) symbols or single carrier frequency division multiple access (SC-FDMA) symbols, the MME comprising:
a radio frequency (RF) unit configured for:
transmitting a bearer setup request for a packet data network (PDN) connection based on local Internet protocol access (LIPA) to a base station;
receiving a bearer setup response from the base station;
determining whether the bearer setup response indicates the base station rejects the bearer setup request for the PDN connection based on the LIPA due to a triggered handover of a user equipment (UE);
if the base station is determined to reject the bearer setup request for the PDN connection based on the LIPA due to the triggered handover of the UE, transmitting a PDN connection reject message to the UE; and
if the base station is determined to reject the bearer setup request for the PDN connection based on the LIPA due to the triggered handover of the UE, releasing a network resource for the PDN connection based on the LIPA.

11. The MME of claim 10, wherein the PDN connection reject message includes a cause code.

12. The MME of claim 11, wherein a value of the cause code is set to '34' indicating service option temporarily out of order.

* * * * *